United States Patent
Tavakoli et al.

(10) Patent No.: US 11,509,182 B2
(45) Date of Patent: Nov. 22, 2022

(54) WIRE GUIDING DEVICE FOR A ROTOR OF A SYNCHRONOUS ELECTRIC MACHINE OF THE WOUND ROTOR TYPE

(71) Applicants: RENAULT s.a.s., Boulogne-Billancourt (FR); NISSAN MOTOR CO., LTD., Yokohama (JP)

(72) Inventors: Shahab Tavakoli, Vaucresson (FR); Anthony Dell Agnese, Argenteuil (FR)

(73) Assignees: RENAULT s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/262,017

(22) PCT Filed: Jun. 24, 2019

(86) PCT No.: PCT/EP2019/066707
§ 371 (c)(1),
(2) Date: Jan. 21, 2021

(87) PCT Pub. No.: WO2020/020551
PCT Pub. Date: Jan. 30, 2020

(65) Prior Publication Data
US 2021/0296959 A1    Sep. 23, 2021

(30) Foreign Application Priority Data
Jul. 23, 2018 (FR) ...................................... 18 56779

(51) Int. Cl.
*H02K 3/52*     (2006.01)
*H02K 1/24*     (2006.01)
(Continued)

(52) U.S. Cl.
CPC ............... *H02K 3/527* (2013.01); *H02K 1/24* (2013.01); *H02K 7/04* (2013.01); *H02K 15/022* (2013.01); *H02K 15/165* (2013.01)

(58) Field of Classification Search
CPC ... H02K 7/00; H02K 7/04; H02K 7/11; H02K 7/116; H02K 3/34; H02K 3/345;
(Continued)

(56) References Cited

U.S. PATENT DOCUMENTS

2001/0006316 A1   7/2001   Berger
2003/0015935 A1   1/2003   Berger
(Continued)

FOREIGN PATENT DOCUMENTS

DE    102015219685 A1 *   4/2017  ............. H02K 13/00
EP    2 892 134 A1   7/2015
FR    3 062 000 A1   7/2018

OTHER PUBLICATIONS

International Search Report dated Jul. 16, 2019 in PCT/EP2019/066707 filed on Jun. 24, 2019, 2 pages.

*Primary Examiner* — Tran N Nguyen
(74) *Attorney, Agent, or Firm* — Oblon, McClelland, Maier & Nuestadt, L.L.P.

(57) ABSTRACT

A guiding device is for the winding of electrically conductive wires about a plurality of poles of a rotor of an electric machine that are distributed about a shaft extending axially in the rotor. The device includes a guide head that is able to be mounted on the shaft. The guide head includes a metallic basic structure provided with a plurality of arms that extend radially from an inner part of the metallic basic structure provided with a central orifice, and a plastics structure overmoulded on the metallic basic structure, in a set-back manner with respect to an internal cylindrical surface of the central orifice, such that the internal cylindrical surface of the central orifice of the metallic basic structure is designed (Continued)

to be in direct contact with the shaft of the rotor for mounting on the shaft of the rotor with an interference fit.

10 Claims, 2 Drawing Sheets

(51) Int. Cl.
*H02K 7/04* (2006.01)
*H02K 15/02* (2006.01)
*H02K 15/16* (2006.01)

(58) Field of Classification Search
CPC ............ H02K 3/38; H02K 3/48; H02K 3/487; H02K 3/52; H02K 3/522; H02K 3/527
See application file for complete search history.

(56) References Cited

U.S. PATENT DOCUMENTS

| | | |
|---|---|---|
| 2003/0048023 A1 | 3/2003 | Nagai et al. |
| 2015/0244224 A1 | 8/2015 | Kawashima et al. |
| 2018/0226853 A1 | 8/2018 | Kawashima et al. |

\* cited by examiner

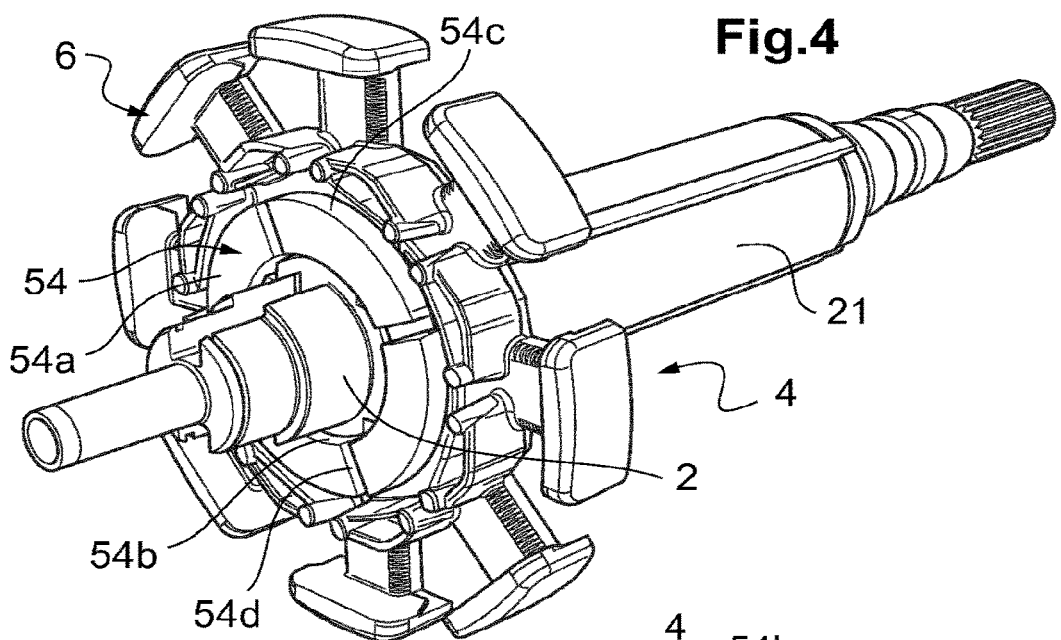
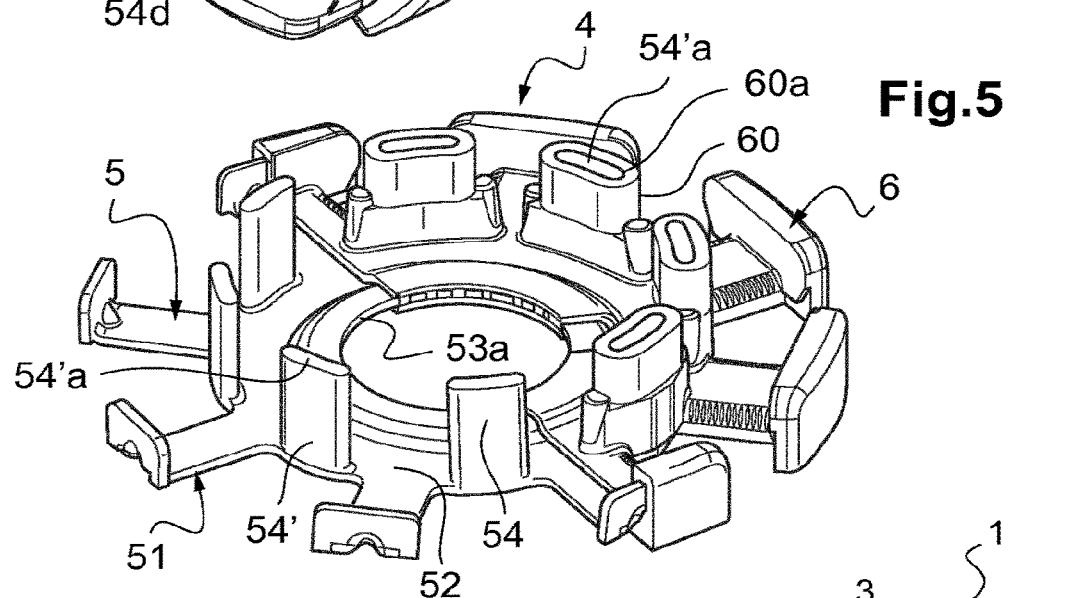
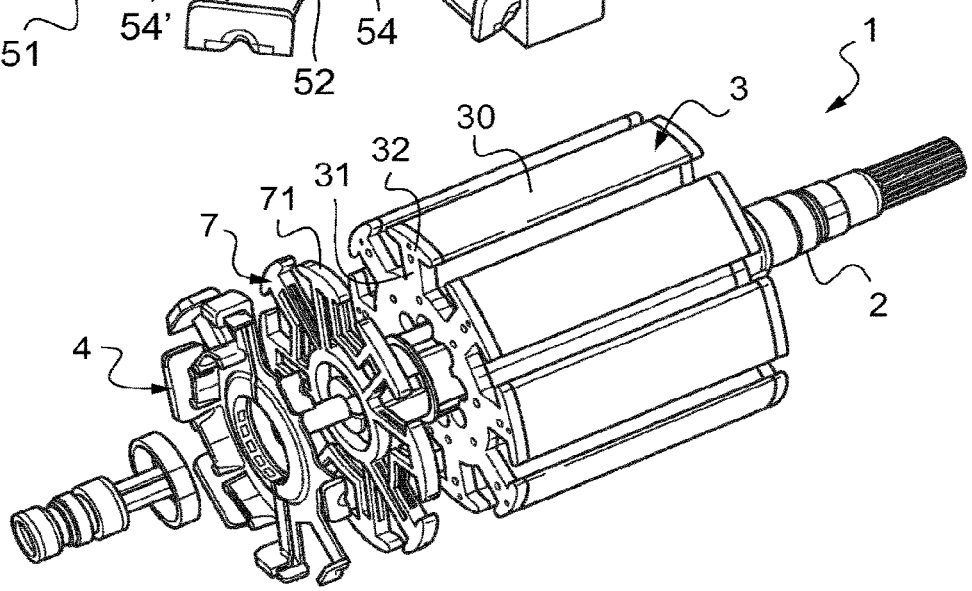

WIRE GUIDING DEVICE FOR A ROTOR OF A SYNCHRONOUS ELECTRIC MACHINE OF THE WOUND ROTOR TYPE

BACKGROUND

The present invention relates to the field of wound rotor synchronous electric machines. It relates more particularly to a guide device for the winding of electrically conductive wires around a plurality of poles of an electric machine rotor that are distributed around a shaft extending axially through the rotor, the device comprising a guide head that is able to be mounted on the shaft.

A rotor of a synchronous electric machine of the wound rotor type has a rotor shaft intended to be mounted so as to rotate about its axis, a set of laminations mounted coaxially on the rotor shaft, said set of laminations having a plurality of radially protruding poles, a winding of electrically conductive wires being intended to be wound around each pole. A head for guiding the electrically conductive wires around each pole of the rotor is arranged axially on either side of the set of laminations, each guide head being provided with a central orifice for the shaft to pass through.

A field of application of the invention is that of electric machines used in motor vehicles of the electric or hybrid type.

The patent document FR 2 984 034 discloses a wound rotor, which is used in particular in an electric machine for an electric traction motor vehicle, incorporating a guide device for fixing the wires of the windings around the poles realized by a stack of laminations.

High speed rotors are subjected to difficult operating conditions and in particular high stress loadings in the radial direction. In particular, the windings of the rotor are subjected to high centrifugal forces during operation of the rotor and have to be held properly. The two guide heads for the winding wires (also referred to as "coil head guide") are also highly stressed by the centrifugal force during the rotation of the rotor and thus have to be adapted to function under such conditions. In addition, each guide head is conventionally secured to a crown, which is an independent part from the body of the rotor and is disposed at the outer periphery of a guide head so as to form a means for radially holding the guide head. More specifically, the crown has an annular configuration about the outer periphery of the guide head, its profile having an L shape having a wing that is oriented axially and rests on the outer periphery of the guide head, and a wing that is oriented radially toward the axis and rests on a radial end face of each pole of the guide head. In order to allow the crown to be fixed to the guide head, the crown has orifices in its radial wing, said orifices being intended to allow the passage of through-bolts. The radial end faces of the poles of the guide head and the set of laminations have corresponding orifices, such that the through-bolts can pass axially through the crown, the guide head and the set of laminations as far as the opposite side of the rotor, where a locking nut is screwed onto the free end of each through-bolt emerging from the opposite crown. When the nut is tightened with a sufficient torque, typically up to the plastic limit of the through-bolt, the assembly is firmly held so as to remain assembled when the rotor is subjected to high centrifugal forces.

However, this arrangement of crowns for radially holding the guide heads requires a large number of parts, namely the crowns themselves, the through-bolts and nuts, ultimately resulting in an increase in weight. Moreover, this arrangement requires a large number of assembly operations (passage of the through-bolts, operations of screwing the nuts), and it is desirable to seek to reduce these.

Optionally, in order to balance the rotor, a balancing ring may be fixed to the external side of the radial wing of the crown, this ring being provided with cavities distributed around the circumference thereof. The operation of balancing the rotor consists in inserting balancing weights into some of the circumferentially distributed cavities or in removing material from the ring, by drilling the ring. However, this balancing device has a drawback in that the balancing weights are installed on a balancing ring. This consequently requires the presence of a ring, to the detriment of the weight, and an operation of fixing this balancing ring to the crown.

It is also known practice to lock the stack of laminations of the rotor by means of metal retaining rings, which are conventionally disposed around the shaft on either side of the stack of laminations. This disposition makes it possible to protect the rotor from impacts, in particular in the event of an accident, ensuring that the stack of laminations is held in its initial position, but conflicts with the need to lighten the rotor, to reduce the axial dimension thereof and to reduce the number of rotor assembly operations.

BRIEF SUMMARY

In this context, the present invention aims to remedy these drawbacks by proposing a guide device, which otherwise complies with the generic definition thereof given in the above preamble, which is essentially characterized in that said guide head comprises a metal basic structure provided with a plurality of legs extending radially from an interior part of said metal basic structure that is provided with a central orifice, and a plastics structure overmolded on said metal basic structure, in a manner set back from an internal cylindrical surface of said central orifice, said internal cylindrical surface not being overmolded with said plastics structure such that said internal cylindrical surface of said central orifice of said metal basic structure is designed to be in direct contact with the shaft of the rotor in order to be mounted on the shaft of the rotor by way of an interference fit.

By virtue of this arrangement, a guide head is provided that is made up of a single, particularly rigid part, the mounting of the metal part of which on the shaft of the rotor by way of an interference fit ensures that the guide head is held strongly with respect to the shaft, thereby making the function hitherto ensured by the crowns and associated through-bolts obsolete, the latter being able to be eliminated. The rotor assembly operations are thus simplified as a result.

Moreover, the guide head according to the invention, when it is mounted on the shaft of the rotor on each side of the stack of laminations, also makes it possible to effectively take up the axial loads to which the rotor is subjected, in particular in the event of an impact. The guide head according to the invention thus also acts the part that is currently played by the retaining rings, namely that of keeping the stack of laminations in position on the shaft, such that the retaining rings can also be eliminated.

Advantageously, said metal basic structure has at least one solid balancing part protruding axially from an external face of said interior part, at least one surface thereof that extends in a radial plane being free of said overmolded plastics structure so as to be accessible. In particular, if a rotor balancing operation proves to be necessary, this radial surface is able to provide access for a rotor balancing tool by removal of material, typically by drilling, from the solid balancing part(s) protruding from the external face of the interior part of the metal basic structure.

Preferably, a plurality of solid balancing parts are provided that are situated in the vicinity of an exterior edge of said interior part and each extend between two respective legs of said metal basic structure.

Advantageously, said radial surface is free of said overmolded plastics structure by way of a plurality of open cavities that are distributed circumferentially over said overmolded plastics structure.

Advantageously, said metal basic structure is produced in one piece, from an aluminum or steel alloy, by stamping or casting.

The invention also relates to a rotor of a synchronous electric machine of the wound rotor type, having a rotor shaft intended to be mounted so as to rotate about its axis, a set of laminations mounted coaxially on the rotor shaft, said set of laminations having a plurality of radially protruding poles and at least one axial opening, a winding of electrically conductive wires being intended to be wound around each pole, characterized in that it comprises a guide device as described above that is mounted on the shaft on either side of said set of laminations.

According to one embodiment, a balancing plate can be inserted between said set of laminations and each guide head, such that an external cylindrical surface of said balancing plate is accessible. In particular, if a rotor balancing operation proves to be necessary, this external cylindrical surface is able to provide access for a rotor balancing tool by removal of material, typically by drilling, from the balancing plate.

The invention also relates to a method for assembling a rotor as described above, said method comprising:

a step of fitting each of said guide heads on the rotor shaft on either side of said set of laminations by way of an interference fit, at the same time as said set of laminations is fitted on said rotor shaft by way of an interference fit, and a step of winding electrically conductive wires around each pole by way of said guide heads.

Advantageously, when the metal basic structure of the guide head is provided with at least one solid balancing part as described above, the method may comprise a step of balancing the rotor by removal of material from said at least one solid balancing part of said metal basic structure.

Advantageously, according to the embodiment of the rotor with a balancing plate as described above, the method may comprise a step of balancing the rotor by removal of material from said balancing plate.

BRIEF DESCRIPTION OF THE DRAWINGS

Further particular features and advantages of the invention will become apparent from reading the following description of a particular embodiment of the invention, which is given by way of nonlimiting indication, with reference to the appended drawings, in which:

FIG. 4 schematically shows a perspective view of an overmolded guide head according to one particular embodiment of the invention, mounted on the shaft of the rotor;

FIG. 5 schematically shows a perspective view in partial section of the overmolded guide head according to another particular embodiment of the invention;

FIG. 6 schematically shows an exploded view of a rotor according to the invention, with the guide head from FIG. 5 mounted on the rotor and a balancing plate according to one particular embodiment.

DETAILED DESCRIPTION

Figure 1:
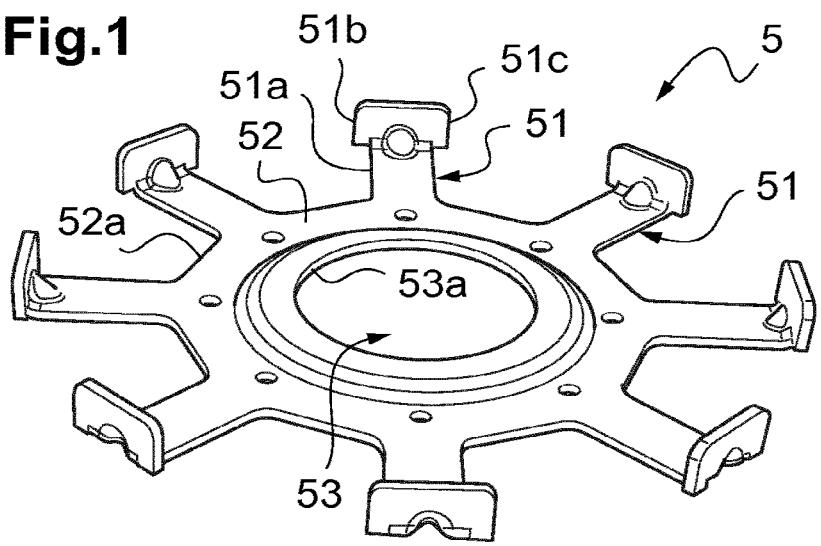
FIG. 1 schematically shows a perspective view of the metal basic structure of a guide head according to one embodiment of the invention.

FIG. 6 schematically illustrates a rotor 1 of an electric machine. The rotor 1 comprises a shaft 2, which extends axially through the rotor 1.

A set of laminations 3 is mounted coaxially on the rotor shaft. This set of laminations 3 is formed by an axial stack of laminations, which extend in a radial plane perpendicular to the axis of the rotor shaft. In this radial plane, the laminations of the set of laminations all have an identical contour. This set of laminations has protruding poles 30, which are distributed regularly in a circumferential direction and protrude from the shaft toward the outer periphery of the rotor. In the exemplary embodiment described with reference to the figures, the set of laminations has eight protruding poles 30. However, the invention is not limited to this type of configuration and applies to a set of laminations having a plurality of protruding poles and, preferably, at least three poles.

The set of laminations 3 is mounted on the cylindrical external surface of the shaft 2 of the rotor by way of an interference fit. Thus, the set of laminations 3 is fitted in the hot state onto the cylindrical external surface of the shaft of the rotor.

Each pole 30 is made up of an arm 31 that extends radially toward the outer periphery of the rotor. The free end 32 of the pole 20 ends in a turn-back protruding circumferentially on either side of the arm 31. The function of the protruding turn-back 32 of each pole 30 is to retain, in the radial direction, an electrically conductive excitation winding that is wound around the radial arm 31 of each pole 30, counter to the centrifugal force to which the excitation winding is subjected during the rotation of the rotor.

Each pole 30 thus has an excitation winding. Guide heads 4, only one of which is shown in FIG. 6, are mounted coaxially with the shaft 2 of the rotor on either side of the set of laminations 3, in order to guide the conductive wires that make up the excitation winding around each pole 30. Each guide head 4 disposed on either side of the set of laminations 3 has the overall shape of a disk extending in a radial plane perpendicular to the axis of the shaft of the rotor.

Figure 2:
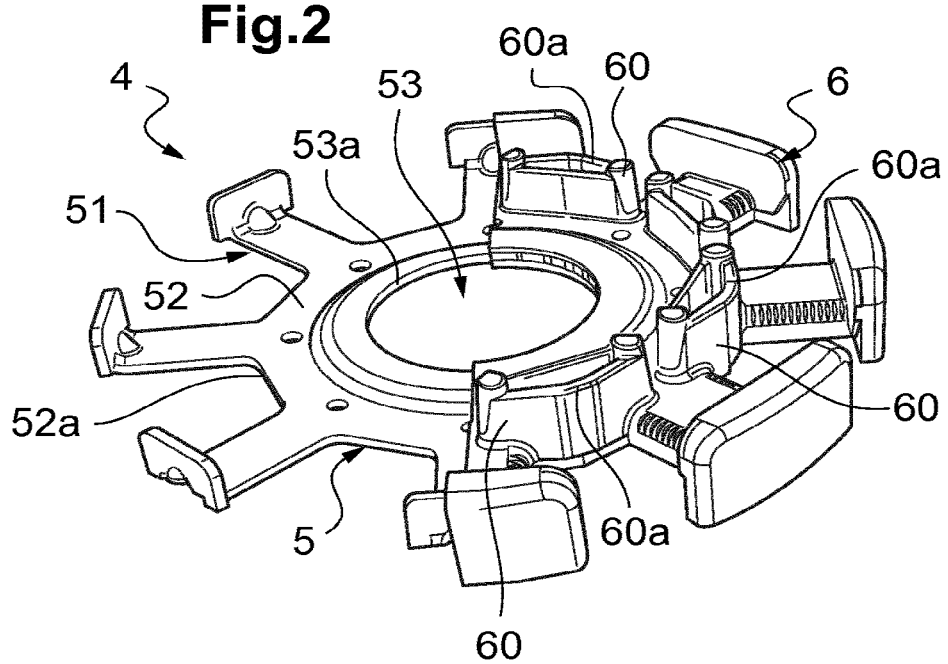
FIG. 2 schematically shows a perspective view in partial section of the overmolded guide head, according to the embodiment in FIG. 1.
Figure 3:
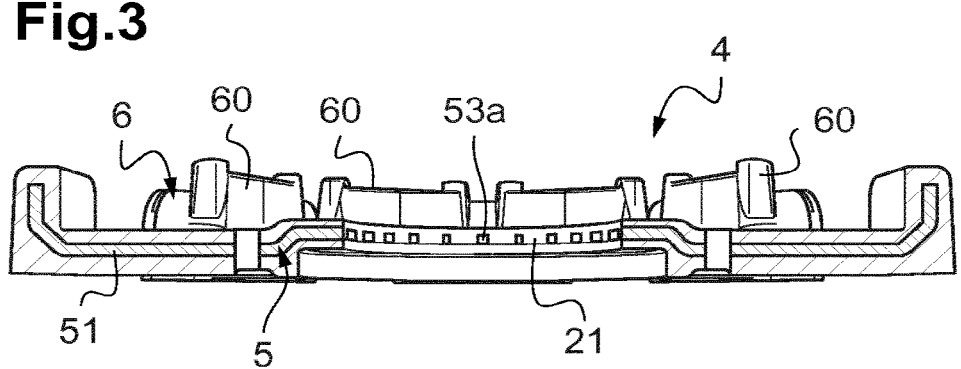
FIG. 3 schematically shows a cross-sectional view of the overmolded guide head illustrated in FIG. 2.

FIGS. 1 to 3 illustrate in more detail the construction of such a guide head, which has the particular feature, according to the invention, of being made up of a metal basic structure 5, as illustrated in FIG. 1, which is overmolded with a plastics structure 6, as illustrated in FIGS. 2 and 3.

In other words, according to the invention, the metal basic structure 5 constitutes a metal insert of the guide head 4, preferably made of aluminum or steel alloy, said guide head 4 being obtained by overmolding at least partially coating this metal insert 5, with the aid of a plastics material of high mechanical strength, such as a thermosetting plastics material, forming the plastics structure 6 of the guide head 4.

As illustrated in FIG. 1, the metal insert 5 is provided with a plurality of legs 51, for example eight, that extend radially from an interior part 52 of the insert, said interior part 52 being provided with a central orifice 53 for coaxial mounting on the shaft of the rotor on which the guide head is intended to be mounted.

Each leg 51 of the metal insert 5 has a main portion 51*a*, which extends radially from the outer edge 52*a* of the interior part 52 and is delimited, at its opposite end from the outer edge 52*a*, by two shoulders 51*b*, 51*c*.

The metal insert 5 as illustrated in FIGS. 1 to 3 is preferably obtained by stamping a metal sheet.

Each radial leg 51 of the metal insert 5 thus forms, once overmolded with the plastics structure 6, a radial leg of the guide head 4, intended to be positioned next to a respective pole 30 of the rotor 1 so as to allow winding. More specifically, the main portion 51*a*, once coated with the overmolded plastics structure 6, is intended to receive a set of conductive wires, said plastics overmolded main portion 51*a* being disposed next to a radial arm 31 of each pole 30 of the set of laminations 2 of the rotor 1 while the two shoulders 51*b*, 51*c*, which are likewise coated with the overmolded plastics structure 6, are intended to be disposed next to the turn-back 32 protruding circumferentially on either side of the arm 31 of each pole 30. The conductive wire of the excitation winding of each pole is thus coiled around the main portion of the corresponding leg of the guide head between the two shoulders in a direction parallel to the shoulders.

According to the invention, provision is made for the plastics structure 6 overmolded on the metal insert 5 to be set back with respect to an internal cylindrical surface 53*a* of the central orifice 53 of the metal insert 5. In other words, this metal internal cylindrical surface 53*a* is not overmolded with the plastics layer 6, such that it can come into direct contact with the external cylindrical surface 21 of the shaft of the rotor in order for the guide head to be mounted on the shaft of the rotor by way of an interference fit. In other words, the two concentric surfaces, namely the external cylindrical surface 21 of the shaft of the rotor and the internal cylindrical surface 53*a* of the guide head 4, respectively, are joined by way of an interference fit.

The guide head 4 is advantageously fixed to the rotor shaft by way of an interference fit at the same time as the set of laminations 3 is fitted on the rotor shaft by way of an interference fit. The operation of winding the wires around the poles of the rotor can then be carried out.

Thus, the guide head 4 also acts as a retaining ring on either side of the stack of laminations, simply because it is fitted on the shaft by way of an interference fit. Specifically, the amount of winding on the guide head is negligible compared with the amount of winding on the poles of the rotor. The stack of laminations is at greater risk of detaching through the inertia of the winding mass than the guide head, and so the fitting of the latter on the shaft by way of an interference fit will be sufficient to lock the stack of laminations with respect to an inertial rotation.

The design of the guide head according to the invention as described above, which is made up of a metal basic structure or metal insert, which is overmolded with a plastics structure, makes it possible to ensure greater stiffening of the guide head, providing greater resistance to the risks of breaking and cracking, in particular with regard to the high centrifugal forces that are likely to be exerted during operation of the rotor.

This design also makes it possible to eliminate parts such as the crowns and associated through-bolts, and the retaining rings, resulting in lightening of the rotor and a reduction in the number of rotor assembly operations.

With reference to FIGS. 2 and 3, the plastics structure 6 overmolded on the metal insert 5 can be provided, on an external face thereof, i.e. on the opposite face from the stack of laminations of the rotor with respect to the guide head when the latter is mounted on the rotor, with circumferentially distributed cavities 60 that are open axially toward the outside of the guide head via an opening 60*a* extending in a radial plane. Preferably, each cavity 60 extends circumferentially between two radial legs of the guide head 4. These cavities 60 in the overmolded plastics structure 6 of the guide head 4 are more particularly suitable for receiving balancing weights, in order to remedy a possible rotor balancing defect.

FIGS. 4 and 5 relate to particular embodiments of the guide head according to the invention, which is designed to make it possible to optionally modify the distribution of the masses on the rotor if balancing of the rotor proves to be necessary, without it being necessary to add additional balancing weights thereto.

To this end, with reference to FIG. 4, the metal insert of the guide head is adapted in that it has a solid balancing part 54, which protrudes axially from an external face of the interior part of the metal insert and has a surface 54*a* extending in a radial plane, which is free of the overmolded plastics structure 6, such that this radial surface 54*a* of the solid balancing part 54 can be accessible. Thus, this radial surface 54*a* makes it possible to provide access in the axial direction for a rotor balancing tool, by removal of material, for example by drilling, from this solid balancing part 54 protruding from the external face of the metal insert of the guide head, thereby making it possible to modify the distribution of the masses on the rotor.

It should be noted that the external face of the metal insert is understood to be the face oriented axially toward the outside of the rotor, i.e. away from the stack of laminations with respect to the guide head when the latter is mounted on the rotor.

According to the particular embodiment in FIG. 4, the solid balancing part 54 of the metal insert forms a continuous crown protruding from the external face, the internal 54*b* and external 54*c* cylindrical surfaces of which extend respectively in the vicinity of the central orifice of the metal insert and in the vicinity of the outer edge of the interior part of the metal insert.

The radial surface 54*a* of the solid balancing part 54 is also provided with radial grooves 54*d* extending between the internal 54*b* and external 54*c* cylindrical surfaces of the solid balancing part 54, which are intended to provide a passage for the winding wires and to protect them during the balancing operation.

FIG. 5 illustrates an embodiment variant of the balancing means provided on the metal insert 5 of the guide head 4. According to this embodiment variant, the balancing means of the metal insert 5 are made up of a plurality of solid balancing parts 54' that protrude axially from the external face in the vicinity of the outer edge 52*a* of the interior part 52 of the metal insert 5 and each extend between two respective legs 51 of the metal insert 5. The cavities 60 in the plastics structure 6 are then overmolded around this plurality of protruding solid balancing parts 54', such that a respective radial surface 54'*a* of each of these solid balancing parts 54' is free of the overmolded plastics structure 6 by way of the opening 60*a* toward the outside of these cavities 60. The radial surfaces 54'*a* are disposed in a flush manner in the plane of the opening 60*a* of the cavities 60.

The embodiments of the guide head illustrated in FIGS. 4 and 5, which describe rotor balancing means integrated in the metal insert of the guide head, make it necessary to adapt the method of manufacturing the metal insert 5, which is preferably obtained by foundry molding, in this context.

FIG. 6 describes yet another embodiment for realizing a possible rotor balancing operation. According to this embodiment, a metal balancing plate 7, produced by casting, the shape of which closely matches the contours of the poles of the rotor, is mounted on the shaft between the set of laminations 3 and each guide head 4 disposed axially on either side of the set of laminations 3. This balancing plate 7 has an external peripheral cylindrical surface 71 that is able to provide access in the radial direction for a rotor balancing tool, by removal of material, for example by drilling, from this balancing plate if a modification of the distribution of the masses on the rotor proves to be necessary.

The invention claimed is:

1. A guide device for the winding of electrically conductive wires around a plurality of poles of an electric machine rotor that are distributed around a shaft that extends axially through the rotor, said device comprising:
   a guide head that is configured to be mounted on the shaft, wherein said guide head comprises a metal structure provided with a plurality of legs extending radially from an interior part of said metal structure that is provided with a central orifice, and a plastics structure overmolded on said metal structure, in a manner set back from an internal cylindrical surface of said central orifice, said internal cylindrical surface not being overmolded with said plastics structure such that said internal cylindrical surface of said central orifice of said metal structure is configured to be in direct contact with the shaft of the rotor in order to be mounted on the shaft of the rotor by way of an interference fit,
   wherein said metal structure has at least one solid balancing part protruding axially from an external face of said interior part, at least one surface thereof that extends in a radial plane being free of said overmolded plastics structure so as to be accessible.

2. The guide device as claimed in claim 1, wherein said metal structure comprises a plurality of the solid balancing parts that are situated in the vicinity of an exterior edge of said interior part and each extend between two respective legs of said metal structure.

3. The guide device as claimed in claim 2, wherein said radial surface is free of said overmolded plastics structure by way of a plurality of open cavities that are distributed circumferentially over said overmolded plastics structure.

4. The guide device as claimed in claim 1, wherein said metal structure is produced in one piece, from an aluminum or steel alloy, by stamping or casting.

5. A rotor of a synchronous electric machine of the wound rotor type, comprising:
   a rotor shaft configured to be mounted so as to rotate about its axis,
   a set of laminations mounted coaxially on the rotor shaft, said set of laminations having a plurality of radially protruding poles and at least one axial opening,
   a winding of electrically conductive wires being configured to be wound around each pole, and
   two of the guide device as claimed in claim 1 that are mounted on the shaft on either side of said set of laminations.

6. The rotor as claimed in claim 5, further comprising a balancing plate inserted between said set of laminations and each guide head, such that an external peripheral cylindrical surface of said balancing plate is accessible.

7. A method for assembling the rotor as claimed in claim 5, said method comprising:
   fitting each of said guide heads on the rotor shaft on either side of said set of laminations by way of an interference fit, at the same time as said set of laminations is fitted on said rotor shaft by way of an interference fit; and
   winding electrically conductive wires around each pole by way of said guide heads.

8. The method as claimed in claim 7,
   wherein said method further comprises balancing the rotor by removal of material from said at least one solid balancing part of said metal structure.

9. The method as claimed in claim 7,
   wherein the rotor further comprises a balancing plate inserted between said set of laminations and each guide head, such that an external peripheral cylindrical surface of said balancing plate is accessible,
   wherein the method further comprises balancing the rotor by removal of material from said balancing plate.

10. A rotor of a synchronous electric machine of the wound rotor type, comprising:
    a rotor shaft configured to be mounted so as to rotate about its axis,
    a set of laminations mounted coaxially on the rotor shaft, said set of laminations having a plurality of radially protruding poles and at least one axial opening,
    a winding of electrically conductive wires being configured to be wound around each pole,
    two guide devices that are mounted on the shaft on either side of said set of laminations, the guide devices guide the winding of electrically conductive wires around the plurality of poles, each of said guide devices comprising:
       a guide head that is configured to be mounted on the shaft, wherein said guide head comprises a metal structure provided with a plurality of legs extending radially from an interior part of said metal structure that is provided with a central orifice, and a plastics structure overmolded on said metal structure, in a manner set back from an internal cylindrical surface of said central orifice, said internal cylindrical surface not being overmolded with said plastics structure such that said internal cylindrical surface of said central orifice of said metal structure is configured to be in direct contact with the shaft of the rotor in order to be mounted on the shaft of the rotor by way of an interference fit, and
    a balancing plate inserted between said set of laminations and each guide head, such that an external peripheral cylindrical surface of said balancing plate is accessible.

\* \* \* \* \*